US010327211B2

(12) United States Patent
Lee

(10) Patent No.: US 10,327,211 B2
(45) Date of Patent: Jun. 18, 2019

(54) ELECTRONIC APPARATUS, WIRELESS SIGNAL RECEIVING METHOD THEREOF AND SYSTEMS HAVING THE SAME

(71) Applicant: SAMSUNG ELECTRONICS CO., LTD., Suwon-si, Gyeonggi-do (KR)

(72) Inventor: Hyun-Hwa Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/318,499

(22) PCT Filed: Jun. 24, 2015

(86) PCT No.: PCT/KR2015/006458
§ 371 (c)(1),
(2) Date: Dec. 13, 2016

(87) PCT Pub. No.: WO2015/199452
PCT Pub. Date: Dec. 30, 2015

(65) Prior Publication Data
US 2017/0111871 A1     Apr. 20, 2017

(30) Foreign Application Priority Data

Jun. 24, 2014   (KR) .................. 10-2014-0077529

(51) Int. Cl.
*H04W 52/24* (2009.01)
*H04B 1/00* (2006.01)
*H04B 17/00* (2015.01)
(Continued)

(52) U.S. Cl.
CPC ............ *H04W 52/243* (2013.01); *H04B 1/00* (2013.01); *H04B 15/00* (2013.01); *H04B 17/00* (2013.01);
(Continued)

(58) Field of Classification Search
None
See application file for complete search history.

(56) References Cited

U.S. PATENT DOCUMENTS 5,239,683 A * 8/1993 Usui ................. H04B 1/109
                                                            455/254
8,339,096 B2 * 12/2012 Osada ............ G06K 19/0701
                                                            307/104

(Continued)

FOREIGN PATENT DOCUMENTS

KR    10-2009-0104482    10/2009
KR    10-2011-0069890    6/2011
WO    2014/028802 A1    2/2014

OTHER PUBLICATIONS

International Search Report dated Oct. 20, 2015 in corresponding International Application No. PCT/KR2015/006458.

(Continued)

*Primary Examiner* — German Viana Di Prisco
(74) *Attorney, Agent, or Firm* — Staas & Halsey LLP

(57) ABSTRACT

Disclosed are an electronic apparatus, a wireless signal receiving method thereof and systems having the same, which can prevent a problem in that when a first wireless module receives a first wireless signal, the first wireless signal is distorted due to an interference by a second wireless module for transmitting and receiving a second wireless signal, thereby resulting in malfunctions or errors in data reception. The electronic apparatus includes a first wireless module configured to receive, or transmit and receive a first wireless signal corresponding to a user's input from, or to and from an external apparatus, a second wireless module configured to transmit and receive a second wireless signal different from the first wireless signal via a network, and a controller configured to determine whether the first wireless signal received is a normal signal, and control a power (Continued)

supplied to the second wireless module, based on the determination.

26 Claims, 10 Drawing Sheets

(51) Int. Cl.
    *H04B 17/345* (2015.01)
    *H04W 24/08* (2009.01)
    *H04B 15/00* (2006.01)
    *H04W 88/06* (2009.01)

(52) U.S. Cl.
    CPC .......... *H04B 17/345* (2015.01); *H04W 24/08* (2013.01); *H04W 88/06* (2013.01)

(56) References Cited

U.S. PATENT DOCUMENTS

| | | |
|---|---|---|
| 8,942,630 B2 | 1/2015 | Lee et al. |
| 9,042,479 B2 | 5/2015 | Eitan |
| 10,014,705 B2 * | 7/2018 | Baratzadeh ........... H02J 7/0052 |
| 2007/0004336 A1 * | 1/2007 | Aloni-Lavi ........... H04W 28/18 455/63.1 |
| 2010/0304770 A1 * | 12/2010 | Wietfeldt .......... H04W 72/1215 455/509 |
| 2011/0312288 A1 | 12/2011 | Fu et al. |
| 2012/0163307 A1 | 6/2012 | Wang et al. |
| 2012/0213116 A1 | 8/2012 | Koo et al. |
| 2012/0329515 A1 | 12/2012 | Husted et al. |
| 2013/0021478 A1 * | 1/2013 | Hobrock ................ G08C 23/04 348/177 |
| 2014/0086129 A1 | 3/2014 | Gong et al. |

OTHER PUBLICATIONS

Extended European Search Report dated Jan. 19, 2018, in corresponding European Patent Application No. 15812546.8, 8 pgs.

\* cited by examiner

ELECTRONIC APPARATUS, WIRELESS SIGNAL RECEIVING METHOD THEREOF AND SYSTEMS HAVING THE SAME

CROSS-REFERENCE TO RELATED APPLICATION

This application is a U.S. national stage application, which claims the benefit under 35USC § 371 of PCT International Patent Application No. PCT/KR 2015/006458 filed Jun. 24, 2015 which claims foreign priority from Korean Patent Application No. 10-2014-0077529, filed on Jun. 24, 2014 in the Korean Intellectual Property Office, the entire disclosures of which are incorporated herein by reference.

BACKGROUND

Field

Apparatuses and methods consistent with exemplary embodiments relate to an electronic apparatus, a wireless signal receiving method thereof and systems having the same, and more particularly, an electronic apparatus which transmits and receives a control signal or data by using a first wireless signal, such as an infrared (IR) signal or a Bluetooth signal, and a second wireless signal, such as a WiFi (wireless Fidelity) signal or a long term evolution (LTE) signal, a wireless signal receiving method thereof and systems having the same.

Description of Related Art

An electronic apparatus, such as a set-top box, a mobile phone, a smart phone, a notebook computer, a personal digital assistant (PDA), a tablet personal computer (PC) or the like, is generally provided with an IR module or a Bluetooth module (hereinafter, referred to as a first wireless module) to transmit and receive a control signal or data by a first wireless signal, such as an IR signal or a Bluetooth signal. The first wireless module receives the control signal from a remote controller or transmits and receives the data to and from other apparatuses to share the data with the other apparatuses.

In recent, in order to allow a user to do the internet through the electronic apparatus at a place in which an access point such as a wired or wireless router is provided, the electronic apparatuses in which a WiFi module or a LTE module (hereinafter, referred to as a second wireless module) is additionally embedded to transmit and receive a control signal or data by a second wireless signal, such as a WiFi signal or a LTE signal, different from the first wireless signal are increasing in number.

However, the electronic apparatus, such as a set-top box, a mobile phone, a smart phone, a notebook computer, a PDA, a tablet PC or the like, is relatively small in size. Thus, there is a problem in that the first and the second wireless modules should be structurally and spatially disposed adjacent to each other.

As a result, the electronic apparatus may present a problem in that if the first wireless module receives the first wireless signal when the second wireless module is in operation, the first wireless signal is interfered with the second wireless signal, a current or the like generated by the second wireless module, so that noises are created in the first wireless signal, thereby resulting in a distortion of the first wireless signal. In this case, the electronic apparatus may fail to recognize the first wireless signal to become uncontrollable or generate errors in data reception.

Accordingly, there is a need for an apparatus including the first and the second wireless modules or method thereof, which can prevent a problem in that when the first wireless module receives the first wireless signal in a state that the second wireless module is operated in operation, noises are created in the first wireless signal to distort the first wireless signal due to the interference by the second wireless module.

SUMMARY

Methods and apparatuses consistent with exemplary embodiments relate an electronic apparatus, a wireless signal receiving method thereof and systems having the same, which can prevent a problem in that when a first wireless module receives a first wireless signal, such as an IR signal or a Bluetooth signal, the first wireless signal is distorted due to an interference by a second wireless module for transmitting and receiving a second wireless signal, such as a WiFi signal or a LTE signal, thereby resulting in malfunctions or errors in data reception.

In accordance with an aspect of an exemplary embodiment, there is provided an electronic apparatus including a first wireless module configured to receive, or transmit and receive a first wireless signal corresponding to a user's input from, or to and from an external apparatus; a second wireless module configured to transmit and receive a second wireless signal different from the first wireless signal via a network; and a controller configured to determine whether the first wireless signal received by the first wireless module is a normal signal, and control a power supplied to the second wireless module, based on the determination. Here, the first wireless module may include at least one of an IR module to generate an IR signal and a Bluetooth module to generate a Bluetooth signal, and the second wireless module may include at least one of a WiFi module to generate a WiFi signal and a long term evolution (LTE) module to generate a LTE signal. With this, the electronic apparatus can prevent the problem in that the IR signal of the IR module or the Bluetooth signal of Bluetooth module is distorted due to an interference by the WiFi module or the LTE module, thereby resulting in malfunctions or errors in data reception.

The electronic apparatus may further include a signal analyzer to analyze the received first wireless signal. With this analysis, an abnormal state in which the first wireless signal is distorted to have noises therein may be detected. At this time, the controller may be configured to control the signal analyzer to analyze the received first wireless signal when the second wireless module is in operation, and determine whether the received first wireless signal is the normal signal based on the analysis. Here, the signal analyzer may be configured to analyze whether the received first wireless signal has a format coinciding with a predetermined pulse format.

The controller may be configured to adjust a voltage supplied to the second wireless module, in a first voltage value if determining that the received wireless signal is the normal signal, and in a second voltage value lower than the first voltage value if determining that the received wireless signal is an abnormal signal. Here, the first voltage value may include a voltage value to normally or stably drive the second wireless module. That is, the first voltage value may include a voltage value defined as a standard.

The second voltage value may include a minimum voltage value required to operate the second wireless module. Alternatively, the second voltage value may include a voltage value to stop an operation of the second wireless module or make the second wireless module wait.

Also, the electronic apparatus may further include a display configured to display an image. In this case, the controller may be configured to activate a control icon for operating the second wireless module to display the activated control icon on the display if determining that the received first wireless signal is the normal signal, and deactivate the control icon to display the deactivated control icon on the display if determining that the received first wireless signal is an abnormal signal. With this, if the second voltage value is supplied to the second wireless module according to the distortion of the first wireless signal, more particularly, if the second wireless module is in an operation stopping state or a standby state, the user can intuitively know the operation state of the second wireless module, thereby improving user's convenience.

The electronic apparatus may include a set-top box, a first mobile phone, a first tablet personal computer (PC), or a first note book computer. At this time, the external apparatus may include a remote controller, a second mobile phone, a second tablet PC, or a second notebook computer.

In accordance with another exemplary embodiment, there is provided a wireless signal receiving method of an electronic apparatus including: receiving, or transmitting and receiving a first wireless signal corresponding to a user's input via a first wireless module from, or to and from an external apparatus; determining whether the received first wireless signal is a normal signal; and controlling a power supplied to a second wireless module for transmitting and receiving a second wireless signal different from the first wireless signal, based on the determination. Here, the first wireless signal may include at least one of an IR signal and a Bluetooth signal, and the second wireless signal may include at least one of a WiFi signal and a LTE signal. With this, the electronic apparatus can prevent the problem in that the IR signal of the IR module or the Bluetooth signal of Bluetooth module is distorted due to an interference by the WiFi module or the LTE module, thereby resulting in malfunctions or errors in data reception.

The determining may include analyzing the received first wireless signal when the second wireless module is in operation, and determine whether the received first wireless signal is the normal signal based on the analysis. Here, the analyzing may include analyzing whether the received first wireless signal has a format coinciding with a predetermined pulse format.

The controlling may include adjusting a voltage supplied to the second wireless module, in a first voltage value if determining that the received wireless signal is the normal signal, and adjusting the voltage supplied to the second wireless module, in a second voltage value lower than the first voltage value if determining that the received wireless signal is an abnormal signal. Here, the first voltage value may include a voltage value to normally or stably drive the second wireless module. That is, the first voltage value may include a voltage value defined as a standard.

The second voltage value may include a minimum voltage value required to operate the second wireless module. Alternatively, the second voltage value may include a voltage value to stop an operation of the second wireless module or make the second wireless module wait.

Also, the controlling may include activating a control icon for operating the second wireless module to display the activated control icon on the display if determining that the received first wireless signal is the normal signal, and deactivating the control icon to display the deactivated control icon on the display if determining that the received first wireless signal is an abnormal signal.

In accordance with further another exemplary embodiment, there is provided a display system including: the above described electronic apparatus configured to receive a broadcast signal and/or broadcasting information; and a display apparatus configured to display the broadcast signal and/or the broadcasting information received by the electronic apparatus.

In accordance with still another exemplary embodiment, there is provided a signal transmitting and receiving system including: the above described first electronic apparatus configured to receive a content by using a first wireless signal and a second wireless signal different from the first wireless signal; and a second electronic apparatus configured to transmit or receive the content from or to the first electronic apparatus by using the first wireless signal and/or the second wireless signal.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, an electronic apparatus, a wireless signal receiving method thereof and systems having the same according to exemplary embodiments will be described with reference to accompanying drawings.

Figure 1:
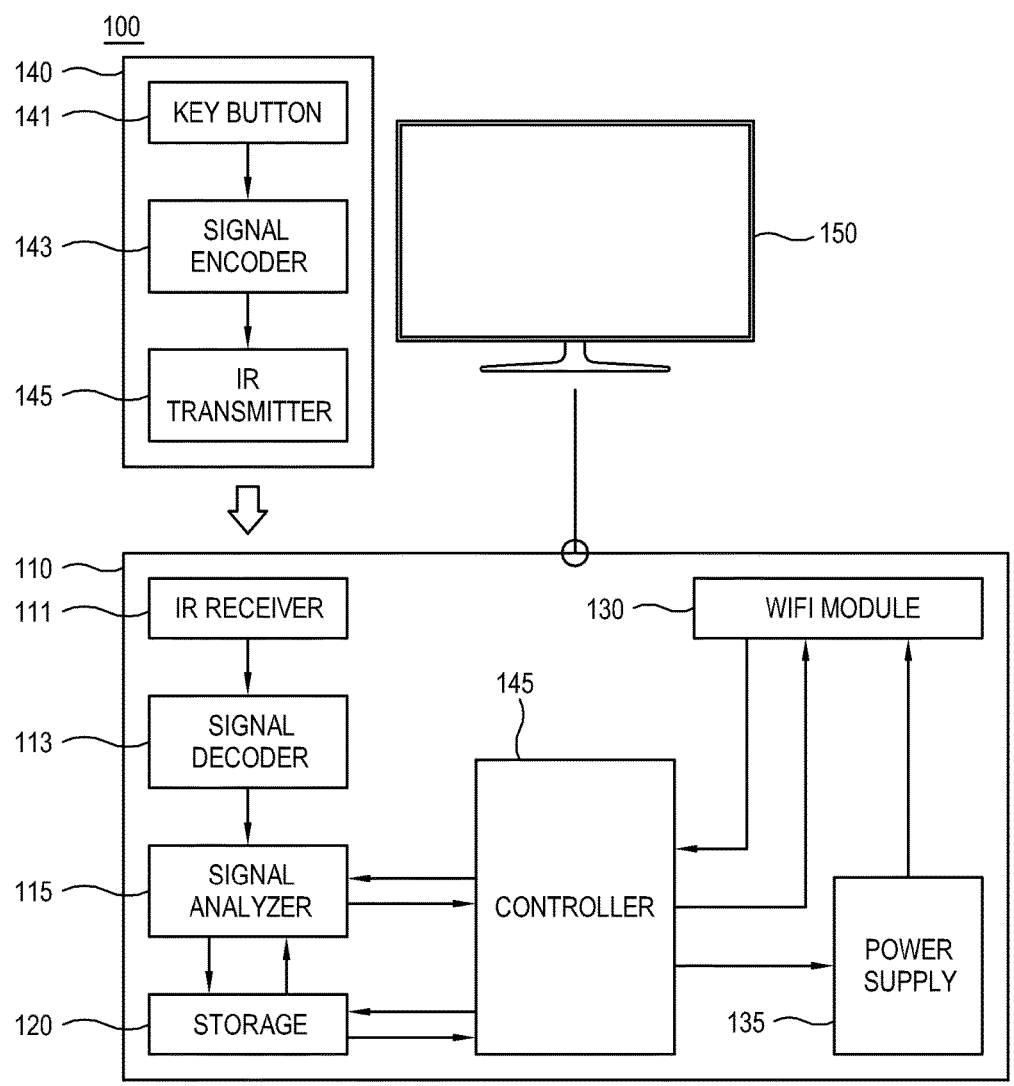
FIG. 1 is a block diagram showing a display system having an electronic apparatus according to an exemplary embodiment.

FIG. 1 is a block diagram showing a display system having an electronic apparatus according to an exemplary embodiment.

The display system 100 according to an exemplary embodiment includes an electronic apparatus 110 and a display apparatus 150.

The electronic apparatus 110 according to an exemplary embodiment is an electronic device having an IR receiver 111 disposed as a first wireless receiver or a first wireless module therein and a WiFi module 130 disposed as a second wireless module therein. The IR receiver 111 receives an IR signal corresponding to a user's input as a first wireless signal from an external apparatus. The WiFi module 130 transmits and receives a WiFi signal as a second wireless signal via an access point (AP) such as a wired or wireless router. In particular, the electronic apparatus 110 may include an electronic apparatus having relatively small size in which that the IR receiver 111 and the WiFi module 130 is structurally and spatially disposed adjacent to each other.

Hereinafter, the electronic apparatus 110 is assumed and explained as, for example, a digital broadcast set-top box, which receives a broadcast signal and/or broadcasting information by wire or wireless through a broadcast receiver (not shown) and transmits the received broadcast signal and/or broadcasting information to the display apparatus 150. Also, since the broadcast receiver is not directly related with the exemplary embodiment, explanation thereon is omitted.

The display apparatus 150 receives and processes the broadcast signal and/or broadcasting information from the electronic apparatus 110 and outputs a video and/or an audio included in the broadcast signal and/or broadcasting information. The display apparatus 150 may include a television (TV), a monitor or the like to output the video and/or the audio. Hereinafter, the display apparatus 150 is assumed as being configured as a TV.

As shown in FIG. 1, the electronic apparatus 110 is a digital broadcast set-top box capable of preventing a problem in which an IR signal is distorted thus to result in an inoperable condition or malfunction thereof, due to an interference by the WiFi module 130 when receiving the IR signal from an external apparatus 140, such as remote controller, and include a IR receiver 111, a signal decoder 113, a signal analyzer 115, a storage 120, a WiFi module 130, and a controller 145.

Figure 2:
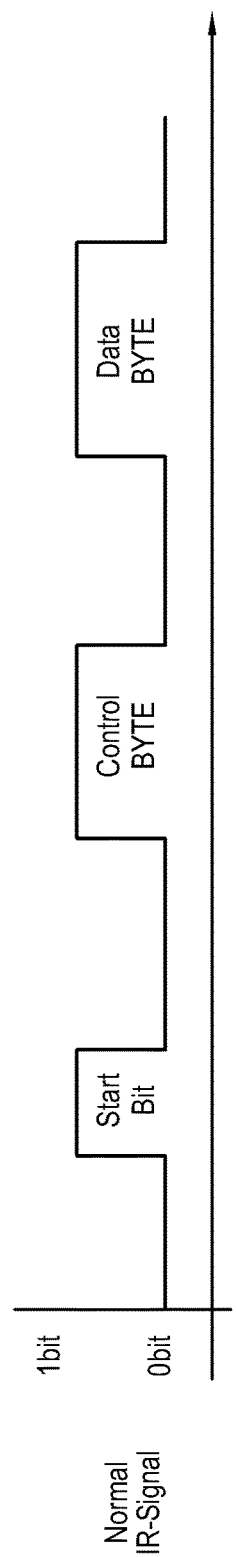
FIGS. 2 to 4 are waveform diagrams respectively showing examples of a remote control signal, an abnormal state of the remote control signal including a noise created due to an interference by a WiFi module, and a detection signal for the abnormal state of the remote control signal according to an exemplary embodiment.

The IR receiver 111 as an IR module receives a remote control signal of an IR frequency band, for example, 38 KHz or 58 KHz, from the remote controller 140 and transmits the received remote control signal to the signal decoder 113. As shown in FIG. 2, the remote control signal may be a signal having a bit pulse form.

Referring to FIG. 2, the remote control signal transmitted by the remote controller 140 may be configured in a pulse format including a start bit pulse StartBit, a control byte pulse ControlByte and a data byte pulse DataByte.

The start bit pulse StartBit is a signal indicating that the remote controller 140 transmits the remote control signal to the electronic apparatus 110. The signal decoder 113 recognizes the start bit pulse StartBit and decodes the data byte pulse DataByte following the start bit pulse StartBit. The data byte pulse DataByte is a signal related to data corresponding to a digit or function key button 141 to be transmitted to the electronic apparatus 110 from the remote controller 140. At the remote controller 140, the data is encoded in a pulse form via a signal encoder 143 to transmit via an IR transmitter 145 to the electronic apparatus 110. The control byte pulse ControlByte is a signal indicating a type, a length, a byte index, etc. of data to be transmitted.

If the user presses a certain digit or function key button 141 of the remote controller 140, the remote controller 140 transmits a pulse signal as shown in FIG. 2, as a remote control signal, to the electronic apparatus 110. The remote controller 140 first transmits a start bit pulse StartBit, and at certain intervals, a control byte pulse ControlByte and a data byte pulse DataByte corresponding to the certain key button 141. The electronic apparatus 110 decodes the transmitted pulse signal and processes a command corresponding thereto.

The signal decoder 113 decodes the pulse signal received from the IR receiver 111. For example, if receiving a certain pulse signal, the signal decoder 113 may analyze the received pulse signal to decode based on a pulse code modulation (PCM) method. A data signal corresponding to the certain digit or function key button 141 decoded in the PCM method is transmitted to the signal analyzer 115.

Figure 3:
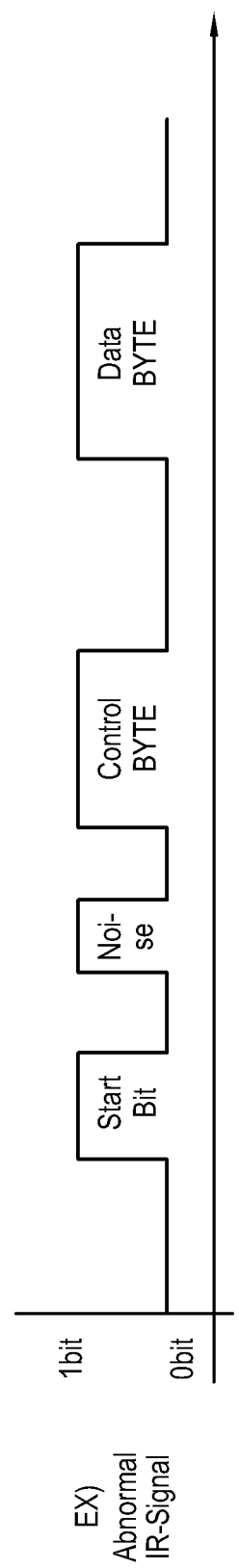

The signal analyzer 115 analyzes whether the received data signal has a format coinciding with a predetermined pulse format of the remote control signal to detect that the received data signal is in an abnormal state (FIG. 4) where it is distorted to have a noise created therein, as shown in FIG. 3. At the same time, the signal analyzer 115 matches the received data signal to a command from among commands stored in advance in the storage 120. The pulse format analysis result and the command matching result are transmitted along with the received data signal to the controller 145.

The storage 120 stores commands of the remote controller, a processing and controlling program for the controller 145, etc.

The storage 120 may be configured as at least one from among storage media comprising a flash memory, a hard disk, a multimedia card micro memory, a card type memory, such as a SD memory, a XD memory or the like, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The WiFi module 130, which is a wireless module to allow the user to do the internet by wireless at a place in which an access point (AP) such as a wired and/or wireless router is provided, transmits and receives a WiFi signal to and from the access point according to an input via the key button 141 of the remote controller 140 or an input via input means, such as a remote controller (not shown) of the display apparatus 150 or the like, under a control of the controller 145. The WiFi module 130 may transmit data in a transmission rate of about 54 Mbps by using a frequency band of 2.4 GHz.

The controller 145 controls a general operation of the electronic apparatus 110 according to the processing and controlling program for the controller 145 stored in the storage 120. The controller 145 may be configured as a central processing unit (CPU).

Also, the controller 145 performs a command according to the command matching result received from the signal analyzer 115 and displays the command matching result through the display apparatus 150.

At this time, as shown in FIG. 3, if the remote control signal is distorted so that the signal analyzer 115 does not match the command or match other command, the electronic apparatus 110 may occur a malfunction or an inoperable condition where it does not perform a function corresponding to the pressed key button 141.

To prevent this, the controller 145 determines whether the received data signal is a normal signal based the pulse format analysis result received the signal analyzer 115, and controls a power supplied to the WiFi module 130 according to the determination.

To be more specific, the controller 145 determines whether the received data signal is an abnormal state (FIG.

Figure 4:
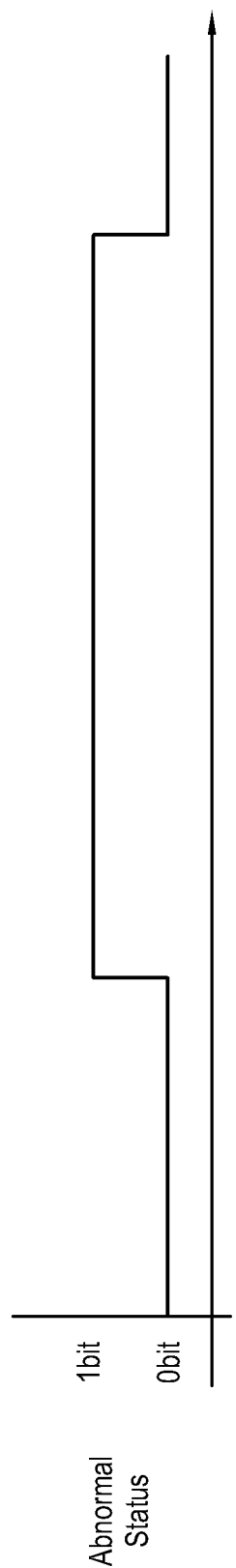

3) where it is distorted to have a noise created therein, based on the received pulse format analysis result (FIG. 4).

Figure 5:
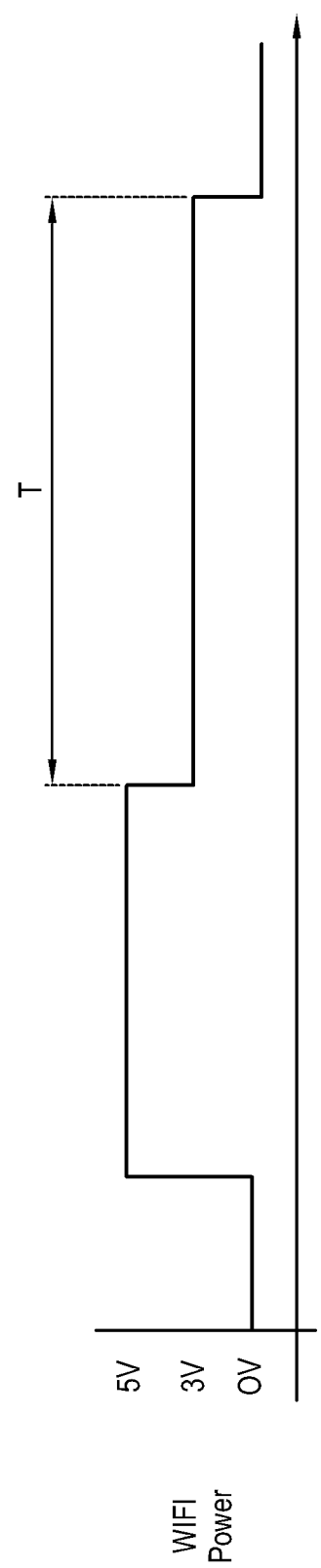
FIGS. 5 and 6 are drawings showing a power supplied to a WiFi module when a remote control signal is an abnormal signal and a time controlling the power with respect to an operation of an IR receiver according to an exemplary embodiment.

If determined that the received data signal is the abnormal state, the controller 145 recognizes that the received data signal is an abnormal signal. In this case, as shown in FIG. 5, the controller 145 control the power supply 135 to supply the WiFi module 130 with a second voltage value lower than a first voltage value to normally or stably drive the WiFi module 130.

Figure 6:
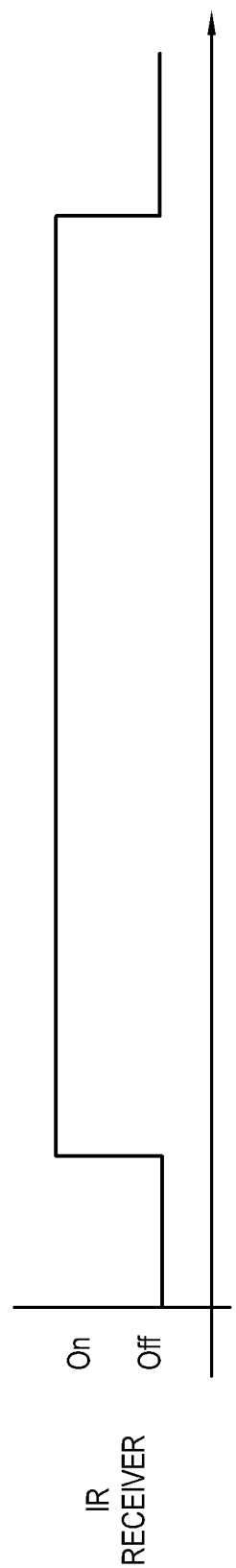

At this time, the power supply 135 is controlled to supply the second voltage value to the WiFi module 130 for a first predetermined time T. In an exemplary embodiment, the first predetermined time T is set as a time from when it is determined that the received data signal is the abnormal signal to when a transmission of the remote control signal from the remote controller 140 is finished so that the IR receiver 111 is turned off, as shown in FIGS. 5 and 6. Alternatively, the first predetermined time T may be set as a time from when it is determined that the received data signal is the abnormal signal to when it is determined that a next remote control signal is a normal signal.

The first and the second voltage values are preset according to a circuit design of the electronic apparatus 110 in manufacture. The first voltage value may include a voltage value defined as a standard to normally or stably drive the WiFi module 130.

The second voltage value may include a minimum voltage value required to operate the WiFi module 130. Alternatively, the second voltage value may include a voltage value to stop an operation of the WiFi module 130 or make the WiFi module 130 wait.

In an exemplary embodiment, the first and the second voltage values are set as 5V and 3V, respectively.

As a result, the electronic apparatus 110 may receive the remote control signal in a normal state where it is free from the interference of the WiFi module 130, from the remote controller 140.

If determined that the received data signal is a normal state where it has a pulse format coinciding with that of the remote control signal, the controller 145 recognizes that the received data signal is a normal signal. At this time, the controller 145 may determine whether a voltage previously supplied to the WiFi module 130 has been adjusted to the second voltage value, and if so, in order to decide whether the voltage supplied to the WiFi module 130 should be returned to the first voltage value, determines whether the currently received data signal is the same with the previously received data signal to which the voltage supplied to the WiFi module 130 is adjusted to the second voltage value. If determined that the currently received data signal is the same with the previously received data signal, the controller 145 controls the power supply 135 to change and supply the voltage currently supplied to the WiFi module 130, into and in the first voltage value which is a normal supply voltage. This reason is that since the previously received data signal is changed into the currently received data signal of the normal signal, there is no need to maintain the voltage currently supplied to the WiFi module 130 in the second voltage value.

Figure 7:
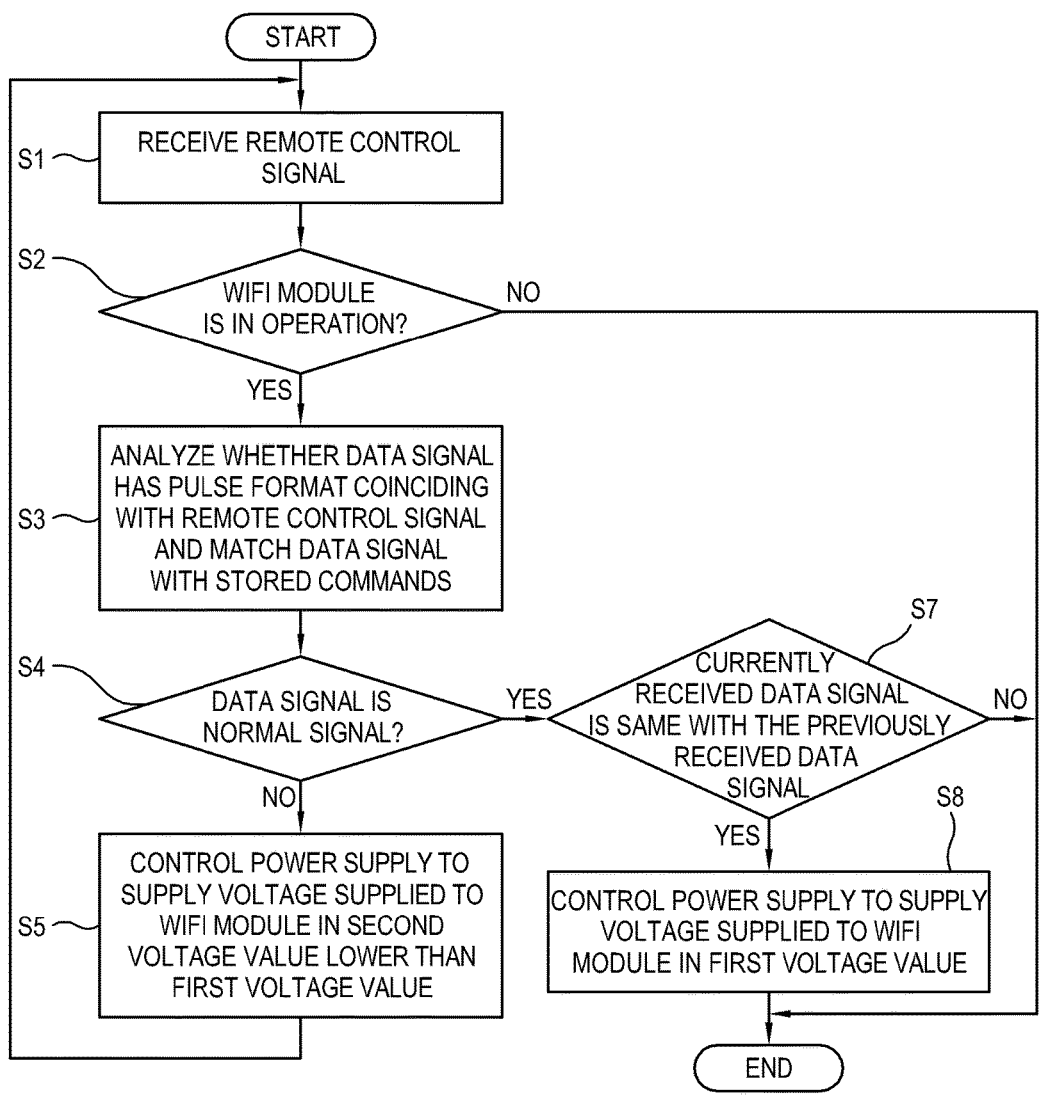
FIG. 7 is a flow chart showing an IR signal receiving operation of the electronic apparatus of the display system, as shown in FIG. 1.

FIG. 7 is a flowchart showing an IR signal receiving operation of an electronic apparatus 110 of the display system 100 according to an exemplary embodiment.

First, if a user presses a certain key button 141, the remote controller 140 transmits a remote control signal, and the IR receiver 111 of the electronic apparatus 110 receives the remote control signal from the remote controller 140 (S1).

Next, the controller 145 determines whether the WiFi module 130 is in an operation (S2).

As a result at the operation S2, if the WiFi module 130 is in the operation, the controller 145 controls the signal analyzer 115 to analyze whether a data signal received via the signal decoder 113 from the IR receiver 111 has a pulse format coinciding with that of the remote control signal, and at the same time, to match the received data signal with a command from among commands stored in advance in the storage 120 (S3). The pulse format analysis result (FIG. 4) and the command matching result are outputted along with the data signal to the controller 145.

The controller 145 determines whether the received data signal is a normal signal based on the pulse format analysis result received from the signal analyzer 115 (S4). Also, the controller 145 performs a command based on the command matching result and transmits the command matching result to the display apparatus 150 to display on the display apparatus 150.

As a result at the operation S4, if the received data signal is an abnormal signal, the controller 145 controls the power supply 135 to supply the WiFi module 130 with a second voltage value lower than a first voltage value, which is a normal or stable supply voltage (S5). If the user presses the key button 141 of the remote controller 140 again, operations after the operation S1 are repeated.

As a result at the operation S4, if the received data signal is a normal signal, the controller 145 determine whether a voltage previously supplied to the WiFi module 130 has been adjusted to the second voltage value, and if so, determines whether the currently received data signal is the same with the previously received data signal to which the voltage supplied to the WiFi module 130 is adjusted to the second voltage value, in order to decide whether the voltage supplied to the WiFi module 130 should be returned to the first voltage value (S7).

As a result at the operation S7, if the currently received data signal is the same with the previously received data signal, the controller 145 controls the power supply 135 to change supply the voltage currently supplied to the WiFi module 130, into and in the first voltage value which is a normal supply voltage (S8), and waits for the user to press other key button 141.

As a result at the operation S7, if the currently received data signal is not the same with the previously received data signal, the controller 145 exits the process and waits for the user to press other key button 141.

Figure 8:
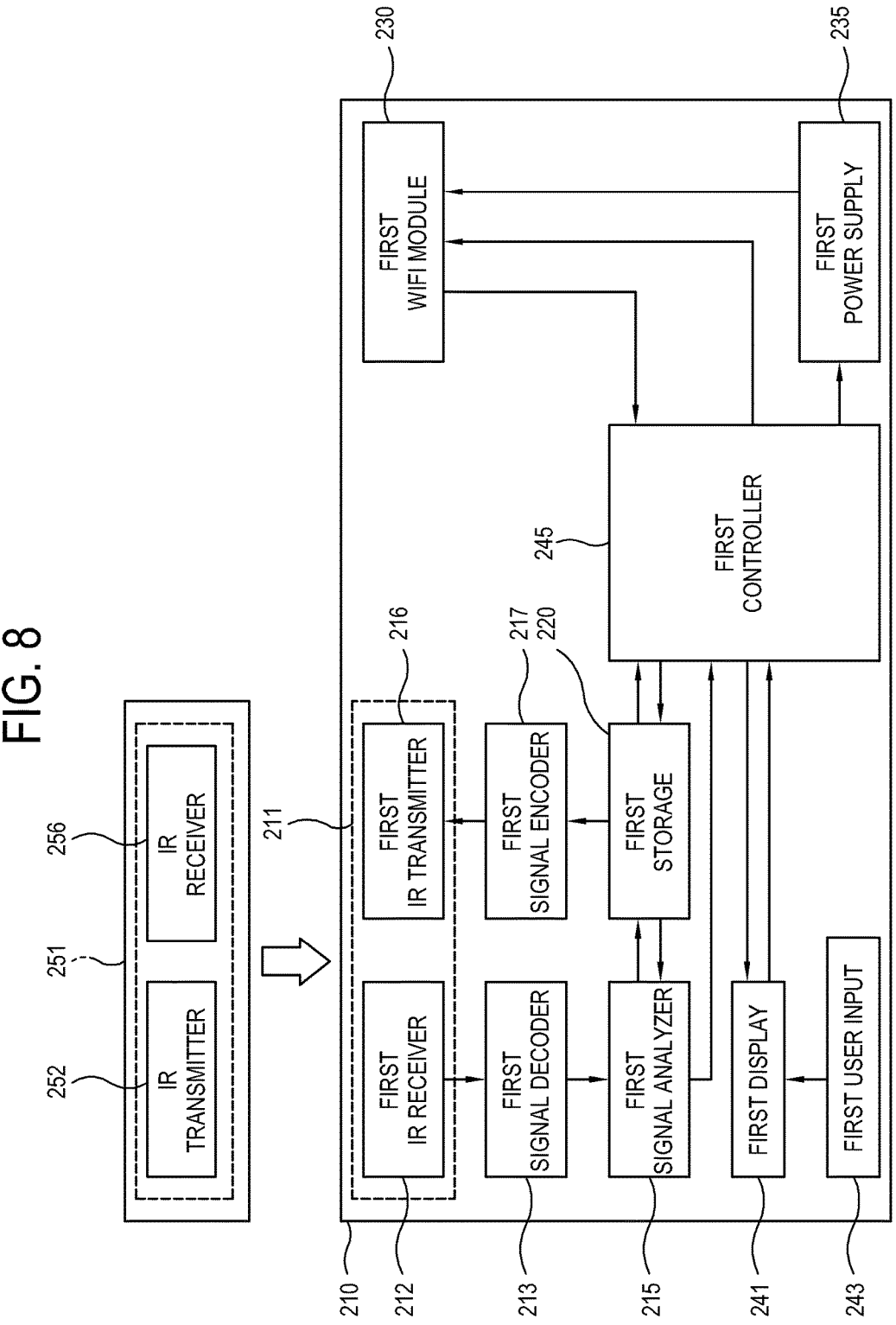
FIG. 8 is a block diagram showing a signal transmitting and receiving system including a first electronic apparatus and a second electronic apparatus according to another exemplary embodiment.

FIG. 8 is a block diagram showing a signal transmitting and receiving system including a first electronic apparatus and a second electronic apparatus according to another exemplary embodiment.

The signal transmitting and receiving system 200 includes a first electronic apparatus 210 and a second electronic apparatus 250.

Each of the first and second electronic apparatuses 210 and 250 may include an electronic apparatus having an IR module 211 or 251 disposed therein to transmit and receive an IR signal to and from a counterpart electronic apparatus 210 or 250 and a WiFi module 230 or 270 disposed therein to transmit and receive a WiFi signal to and from the AP such as the wired and/or wireless router. More particularly, Each of the first and second electronic apparatuses 210 and 250 may include an electronic apparatus, such as a mobile phone, a smart phone, a notebook computer, a PDA, a tablet PC or the like, in which the IR module 211 or 251 and the WiFi module 230 or 270 are structurally or spatially disposed adjacent to each other. Hereinafter, the first and second electronic apparatuses 210 and 250 are assumed and explained as a smart phone.

Thus, the first and second electronic apparatuses 210 and 250 may provide or receive a content, such as a photo, a motion image, a document or the like to or from each other. Hereinafter, for the sake of convenience in explanation, it is assumed that the first electronic apparatuses 210 receives the content from the second electronic apparatuses 250 and the second electronic apparatuses 250 provides the content to the first electronic apparatuses 210.

Also, the first and second electronic apparatuses 210 and 250 may do a wireless internet via the WiFi modules 230 and 270, respectively.

As shown in FIG. 8, the first electronic apparatus 210 is a smart phone capable of preventing a problem in which an IR signal is distorted thus to result in an inoperable condition or malfunction thereof, due to an interference by a first WiFi module 230, when receiving the IR signal from the second electronic apparatus 250 which is a counterpart electronic apparatus, and include a first IR module 211, a first signal decoder 213, a first signal encoder 217, a first signal analyzer 215, a first storage 220, a first WiFi module 230, a first power supply 235, a first display 241, a first user input 243 and a first controller 245.

The construction of the first electronic apparatus 210 is the same as that of the electronic apparatus 110 of the display system 100, as explained with reference to FIG. 1, except for the first IR module 211, the first signal encoder 217, the first signal analyzer 215, the first display 241, the first user input 243 and the first controller 245. Accordingly, only the first IR module 211, the first signal encoder 217, the first signal analyzer 215, the first display 241, the first user input 243 and the first controller 245 will be explained in detail below.

The first IR module 211 includes a first IR receiver 212 and a first IR transmitter 216. The first IR receiver 212 as an IR module receives a remote control signal of an IR frequency band, for example, 38 KHz or 58 KHz from a second IR module 251 of the second electronic apparatus 250 and outputs the received remote control signal to the first signal decoder 213.

The first IR transmitter 216 converts a data signal encoded by the first signal encoder 217 into an IR signal of the IR frequency band to transmit to the second IR module 251 of the second electronic apparatus 250. According to a user's input through the first user input 243, the first signal encoder 217 encodes data for transmission outputted from the first storage 220 to output an encoded data signal to the first IR transmitter 216 under a control of the first controller 245.

The first signal analyzer 215 analyzes whether the data signal outputted from the first signal decoder 213 has a pulse format coinciding with that of the IR signal as shown in FIG. 2 so that it is an abnormal state where it is distorted to include a noise created therein, and outputs the pulse format analysis result along with the received data signal to the first controller 245. At this time, the first signal analyzer 215 may perform the pulse format analysis at regular intervals.

The first display 141 converts image data received from the first controller 245 according to a user's input through the first user input 243 during an operation of the first electronic apparatus 210, into an analog signal to display thereon. The image data may include various motion and still images, a limited number of letters, condition information, etc. That is, the first display 141 may provide various screens according to a use of the first electronic apparatus 210, for example, a lock screen, a home screen, an application execution screen, a menu screen, a message processing screen, a call screen, an internet screen, a keypad screen, etc.

The first display 241 may be configured as a flat plate display panel, such as a liquid crystal display (LCD) panel, an organic light emitted diode (OLED) panel, an active matrix organic limited diode (AMOLED) panel, etc.

The first user input 243 sense a user's input and transmits an input signal corresponding to the sensed user's input to the first controller 245. The first controller 245 controls corresponding components in response to the input signal.

The first user input 243 may be configured as a touch screen disposed on a front surface of the first display 241.

The first controller 245 controls a general operation of the first electronic apparatus 210 according to a processing and controlling program for the first controller 245 stored in the first storage 210.

Also, the first controller 245 stores the data signal received from the first signal analyzer 215 in the first storage 210 and displays an image corresponding to the received data signal on the first display 243. At this time, if the data signal is distorted to have a noise or the like created therein due to an interference by the first WiFi module 230, a problem may arise in that a quality of the received data signal is deteriorated or an error occurs. To prevent this, like the controller 145 of the electronic apparatus 145, the first controller 245 determines whether the received data signal is a normal signal based on the pulse format analysis result received from the first signal analyzer 215, and control a power supplied to the first WiFi module 230 according to the determination.

To be more specific, the first controller 245 determines whether the received data signal is an abnormal state where it is distorted to include a noise therein based on the received pulse format analysis result.

If determined that the received data signal is the abnormal state where it has a pulse format, which does not coincide with that of the IR signal, the first controller 245 determines that the received data signal is an abnormal signal. In this case, the first controller 245 controls the power supply 235 to supply the first WiFi module 230 with a second voltage value lower than a first voltage value for normally or stably driving the first WiFi module 230, for a second predetermined time. Here, the second predetermined time may be set as a time from when it is determined that the received data signal is the abnormal signal to when it is determined that the received data signal is not the abnormal signal from the pulse format analysis result obtained by the pulse format analysis performed at regular intervals. Alternatively, the second predetermined time may be set as a time from when it is determined that the received data signal is the abnormal signal to when it is determined that a transmission of the data signal from the second electronic apparatus 250 is finished.

The first and the second voltage values are preset according to a circuit design of the first electronic apparatus 210 in manufacture. The first voltage value may include a voltage value defined as a standard to normally or stably drive the first WiFi module 230.

The second voltage value may include a minimum voltage value required to operate the first WiFi module 230. Alternatively, the second voltage value may include a voltage value to stop an operation of the first WiFi module 230 or make the first WiFi module 230 wait.

In an exemplary embodiment, the first and the second voltage values are set as 5V and 3V, respectively.

As a result, the first electronic apparatus 210 may receive the data signal in a normal state where it is free from the interference of the first WiFi module 230.

If determined that the received data signal is a normal state where it has a pulse format coinciding with that of the IR signal, the first controller 245 determines that the received data signal is a normal signal. At this time, the first controller 245 controls the first power supply 235 to supply the first WiFi module 230 with the first voltage value which is a normal or stable supply voltage.

Alternatively, the first controller 245 may activate a control icon for operating the first WiFi module 230 to display the activated control icon on the first display 241 If determining that the received data signal is the normal signal, and deactivate the control icon to display the deactivated control icon on the first display 241 if determining that the received data signal is an abnormal signal. With this, if the second voltage value is supplied to the first WiFi module 230 according to the distortion of the data signal, more particularly, if the first WiFi module 230 is in an operation stopping state or a standby state, the user can intuitively know the operation state of the first WiFi module 230, thereby improving user's convenience.

Figure 9:
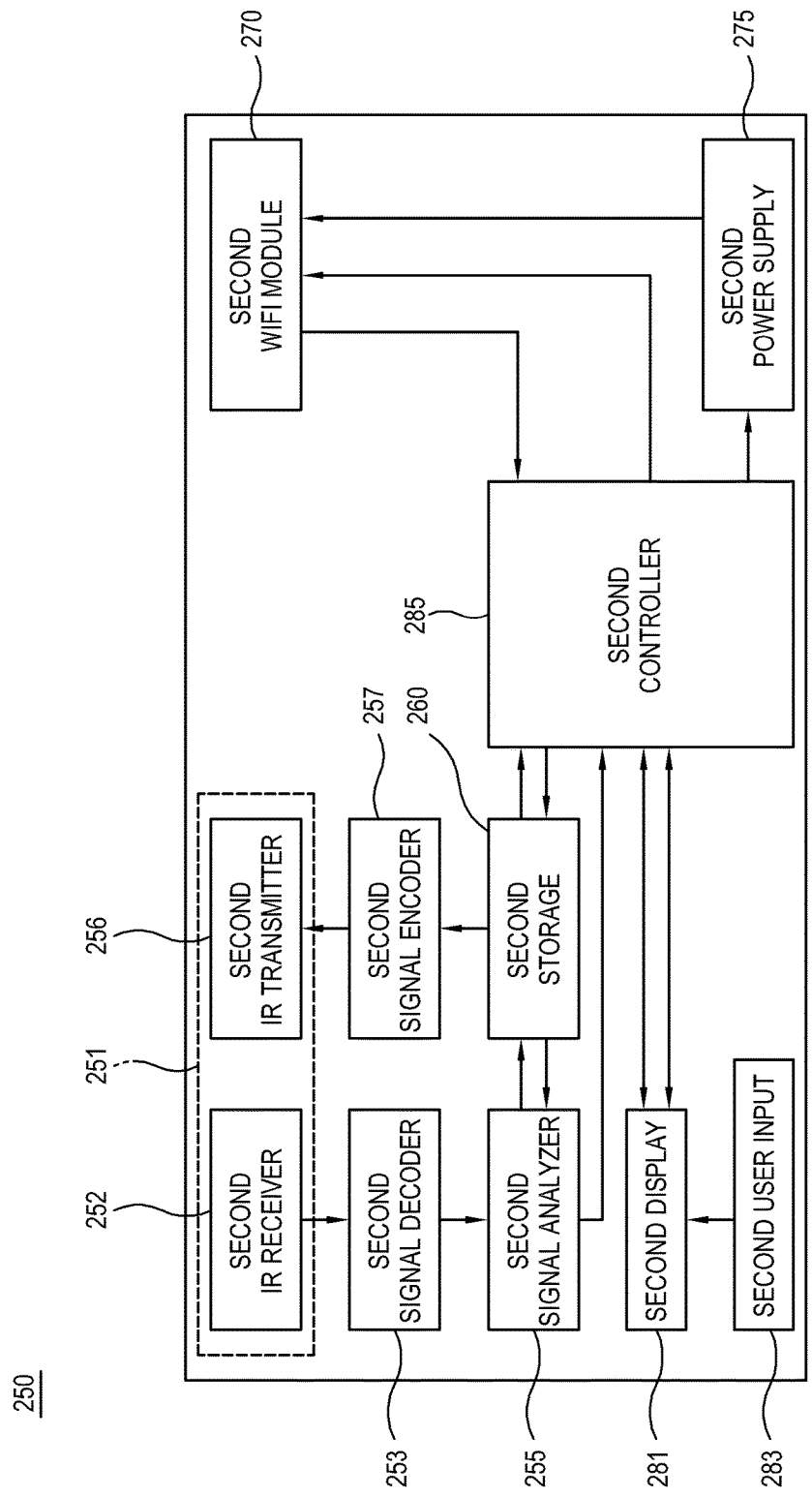
FIG. 9 is a block diagram showing a construction of the second electronic apparatus of the signal transmitting and receiving system, as shown in FIG. 8.

FIG. 9 is a block diagram showing a construction of the second electronic apparatus 250, as shown in FIG. 8.

The second electronic apparatus 250 is a smart phone capable of preventing a problem in which an IR signal is distorted thus to result in an inoperable condition or malfunction thereof, due to an interference by the second WiFi module 270, if receiving the IR signal from the first electronic apparatus 210 which is a counterpart electronic apparatus, and include a second IR module 251, a second signal decoder 253, a second signal encoder 257, a second signal analyzer 255, a second storage 260, a second WiFi module 270, a second power supply 275, a second display 281, a second user input 283 and a second controller 285.

The construction of components 251, 253, 255, 257, 260, 270, 275, 281, 283 and 285 of the second electronic apparatus 250 is the same as that of the first electronic apparatus 210, except that the second controller 285 is assumed as providing the content to the first electronic apparatus 210 even though it can transmit and receives the content to and from the first electronic apparatus 210 by using the second IR module 251.

Accordingly, detailed explanations on components 251, 253, 255, 257, 260, 270, 275, 281, 283 and 285 of the second electronic apparatus 250 will be omitted.

Figure 10:
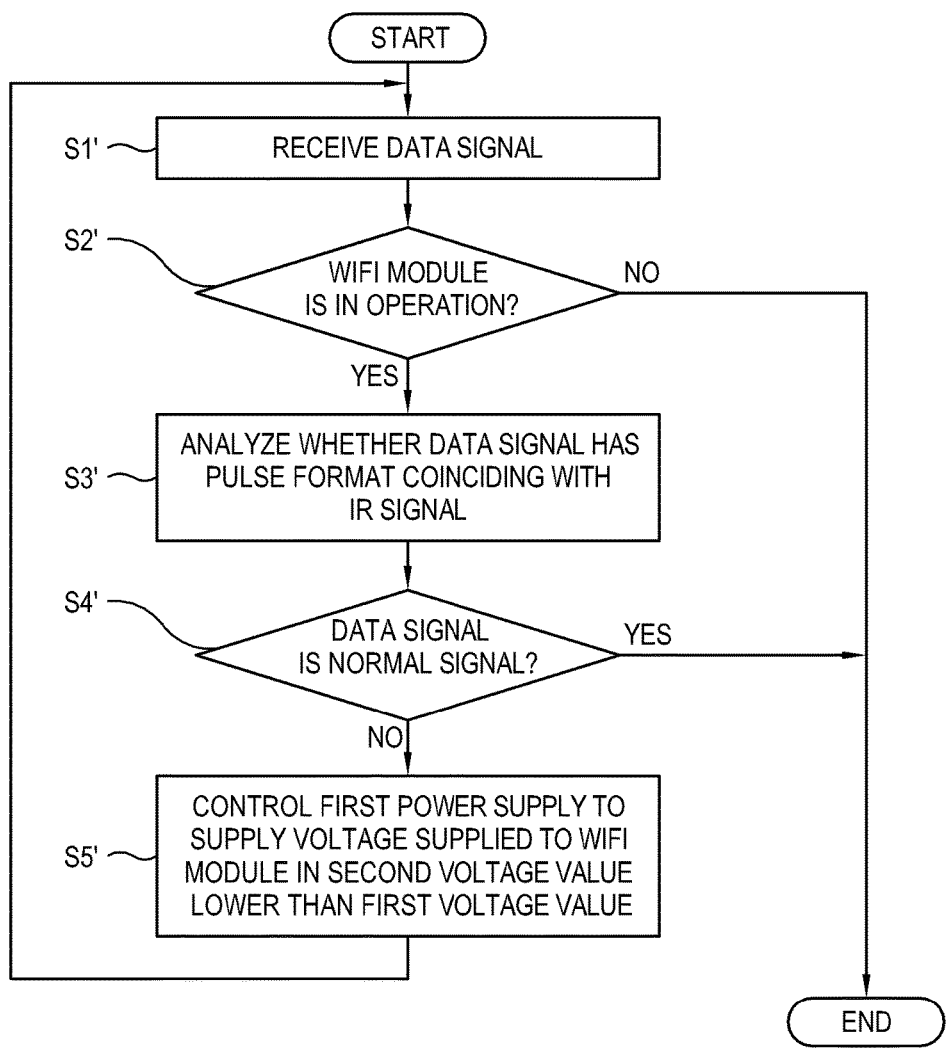
FIG. 10 is a flow chart showing an IR signal receiving operation of the first electronic apparatus of the signal transmitting and receiving system, as shown in FIG. 8.

FIG. 10 is a flow chart showing an IR signal receiving operation of the first electronic apparatus 210 of the signal transmitting and receiving system 200, as shown in FIG. 8

First, a user sets the first and the second electronic apparatuses 210 and 250 in an IR reception mode and an IR transmission mode via the first user inputs 243 and 283, respectively, selects a file to be received and transmitted, and places the first and the second electronic apparatuses 210 and 250 so that the first and the second IR modules 211 and 251 face each other. As a result, a second IR transmitter 256 of the second electronic apparatus 250 transmits a data signal corresponding the selected file and the first IR receiver 212 of the first electronic apparatus 210 receives the data signal (S1')

Next, the first controller 245 determines whether the first WiFi module 230 is in an operation (S2').

As a result at the operation S2', if the first WiFi module 230 is in the operation, the first controller 245 controls the first signal analyzer 215 to analyze whether the data signal received from the first signal decoder 213 has a data transmission pulse format coinciding with that of the IR signal and to output the pulse format analysis result along with the received data signal to the first controller 245 (S3').

And then, the first controller 245 determines whether the received data signal is a normal signal based on the pulse format analysis result outputted from the first signal analyzer 215 (S4').

As a result at the operation S4', if the received data signal is an abnormal signal, the first controller 245 controls the first power supply 235 to supply the first WiFi module 230 with a second voltage value lower than a first voltage value, which is a normal or stable supply voltage, for a second predetermined time (S5'). After a lapse of the second predetermined time, the first controller 245 repeats operations after the operation S1'.

As a result at the operation S4', if the received data signal is the normal signal, the first controller 245 exits the process and waits for receiving a data signal corresponding to other file.

Although the first and the second electronic apparatuses 210 and 250 of the signal transmitting and receiving system 200 have been illustrated and explained as being configured as the same smart phones, the exemplary embodiments is not limited thereto. For example, the first and the second electronic apparatuses 210 and 250 may be configured as different kinds of devices, such as a smart phone and a notebook computer, a smart phone and a tablet PC, a PDA and a tablet PC, etc.

Further, although both the first and the second electronic apparatuses 210 and 250 have been illustrated and explained as being configured as the smart phones having the IR modules 211 and 251 and the WiFi modules 230 and 270, respectively, the exemplary embodiments is not limited thereto. For example, the receiving party's first electronic apparatus 210 may be configured as a smart phone, a mobile phone, a notebook computer, a PDA or a tablet PC having the IR module 211 and the WiFi module 230 and the transmitting party's second electronic apparatus 250 may be configured as a smart phone, a mobile phone, a notebook computer, a PDA or a tablet PC having only the IR module 251.

Furthermore, although the first and the second electronic apparatuses 210 and 250 have been illustrated and explained as including only the first and the second WiFi modules 230 and 270 for transmitting and receiving the WiFi signal as a second wireless module for wireless internet, respectively, the exemplary embodiments is not limited thereto. For example, the first and the second electronic apparatuses 210 and 250 may further include first and second LTE modules (not shown) to transmit and receive a LTE signal for wireless internet. In this case, the first controller 245 may control a voltage of the WiFi modules 230 and 270 and/or the first and second LTE module in the first voltage value if determining that the received IR signal or data signal is a normal signal, and in the second voltage value if determining that the received IR signal or data signal is an abnormal signal.

Also, although the first and the second electronic apparatuses 210 and 250 have been illustrated and explained as including only the first and the second IR modules 211 and 251 for transmitting and receiving the IR signal as a first wireless signal corresponding to the user's input, respectively, the exemplary embodiments is not limited thereto. For example, the first and the second electronic apparatuses 210 and 250 may include first and second Bluetooth modules (not shown) for transmitting and receiving a Bluetooth as the first wireless signal instead of the first and the second IR module 211 and 251, or both the first and the second IR module 211 and 251 and the first and second Bluetooth module. In this case, the abnormal signal determining operations of the first and the second signal analyzers 215 and 255 and the voltage control operation of the first and the second controllers 245 and 285 for the first and/or the second WiFi modules 230 and 270 may be perform in the same method and principle as explained with reference to the first and the second IR modules 211 and 251.

According to the exemplary embodiments as described above, the electronic apparatus 110, 210 or 250, the wireless signal receiving method thereof and the system 100 or 200 having the same transmits and receives a content, a command or data by using the first wireless signal, such as the IR or Bluetooth signal, and the second wireless signal, such as the WiFi or LTE signal. If receiving the first wireless signal, the electronic apparatus 110, 210 or 250 determines whether the received first wireless signal is a normal signal, and adjusts a voltage supplied to the WiFi module 130, 230 or 270 and/or the LTE module in a first voltage value if determining that the received first wireless signal is the normal signal and in a second voltage value lower than the first voltage value if determining that the received first wireless signal is an abnormal signal. Accordingly, the electronic apparatus 110, 210 or 250, the wireless signal receiving method thereof and the system 100 or 200 having the same can prevent a problem in that when the IR receiver or module 111, 211 or 251 and/or the Bluetooth module receives the first wireless signal, such as the IR or Bluetooth signal, the first wireless signal is distorted due to an interference by the WiFi module 130, 230 or 270 and/or the LTE module for transmitting and receiving the second wireless signal, such as the WiFi or LTE signal, thereby resulting in malfunctions or errors in data reception.

Although a few exemplary embodiments have been shown and described with reference to the accompanying drawings, it will be appreciated by those skilled in the art that changes may be made in these exemplary embodiments without departing from the principles and spirit of the present disclosure. Therefore, the foregoings have to be considered as illustrative only and not limited to these exemplary embodiments.

What is claimed is:

1. An electronic apparatus comprising:
   a first wireless receiver to receive a first wireless signal corresponding to a user's input in a first communication method from an external apparatus;
   a second wireless transceiver to transmit and receive a second wireless signal in a second communication method different from the first communication method via a network, the second wireless transceiver being supplied a first voltage value; and
   a controller configured to:
   compare data included in the first wireless signal received by the first wireless receiver with standard data of the first communication method to identify whether a noise exists in the data included in the first wireless signal, and
   in response to identifying that the noise exists in the data included in the first wireless signal, control a power supply to change a power supplied to the second wireless transceiver to a second voltage value less than the first voltage value.

2. The apparatus according to claim 1,
   wherein the first wireless receiver comprises at least one of an infrared (IR) device to generate an IR signal and a Bluetooth device to generate a Bluetooth signal, and wherein the second wireless transceiver comprises at least one of a wireless fidelity (WiFi) device to generate a WiFi signal and a long term evolution (LTE) device to generate a LTE signal.

3. The apparatus according to claim 1, further comprising a signal analyzer to analyze the received first wireless signal.

4. The apparatus according to claim 3, wherein the controller is configured to control the signal analyzer to analyze the received first wireless signal when the second wireless transceiver is in operation, and identify whether the noise exists in the data included in the received first wireless signal based on the analysis.

5. The apparatus according to claim 4, wherein the signal analyzer is configured to analyze whether the received first wireless signal has a format coinciding with a predetermined pulse format.

6. The apparatus according to claim 1, wherein the power supplied to the second wireless is the first voltage value when identifying that the noise does not exist in the data included in the received first wireless signal.

7. The apparatus according to claim 6, wherein the first voltage value corresponds to a voltage value to normally or stably drive the second wireless transceiver.

8. The apparatus according to claim 7, wherein the first voltage value corresponds to a voltage value defined as a standard.

9. The apparatus according to claim 7, wherein the second voltage value corresponds to a minimum voltage value required to operate the second wireless transceiver.

10. The apparatus according to claim 7, wherein the second voltage value corresponds to a voltage value to stop an operation of the second wireless transceiver or make the second wireless transceiver wait.

11. The apparatus according to claim 1, further comprising a display configured to display an image.

12. The apparatus according to claim 11, wherein the controller is configured to activate a control icon to operate the second wireless transceiver to display the activated control icon on the display when identifying that the noise exists in the data included in the received first wireless signal, and deactivate the control icon to display the deactivated control icon on the display when identifying that the noise does not exist in the data included in the received first wireless signal.

13. The apparatus according to claim 1, wherein the electronic apparatus is a set-top box, a first mobile phone, a first tablet personal computer (PC), or a first note book computer.

14. The apparatus according to claim 13, wherein the external apparatus comprises a remote controller, a second mobile phone, a second tablet PC, or a second note book computer.

15. A wireless signal receiving method of an electronic apparatus comprising:
   receiving a first wireless signal corresponding to a user's input in a first communication method via a first wireless receiver from an external apparatus;
   comparing data included in the first wireless signal received by the first wireless receiver with standard data of the first communication method to identify whether a noise exists in the data included in the first wireless signal; and
   in response to identifying that the noise exists in the data included in the first wireless signal, control a power supply to change a power supplied to a second wireless transceiver to a second voltage value less than a first voltage value for transmitting and receiving a second wireless signal in a second communication method different from the first communication method.

16. The method according to claim 15, wherein the first wireless signal comprises at least one of an infrared (IR) signal and a Bluetooth signal, and wherein the second wireless signal comprises at least one of a wireless fidelity (WiFi) signal and a long term evolution (LTE) signal.

17. The method according to claim 15, wherein the identifying comprises:
analyzing the received first wireless signal when the second wireless transceiver is in operation, and
identify whether the noise exists in the data included in the received first wireless signal based on the analysis.

18. The method according to claim 17, wherein the analyzing comprises analyzing whether the received first wireless signal has a format coinciding with a predetermined pulse format.

19. The method according to claim 15, wherein the power supplied to the second wireless transceiver is the first voltage value when identifying that the noise does not exist in the data included in the received first wireless signal.

20. The method according to claim 19, wherein the first voltage value comprises a voltage value to normally or stably drive the second wireless transceiver.

21. The method according to claim 20, wherein the first voltage value comprises a voltage value defined as a standard.

22. The method according to claim 19, wherein the second voltage value comprises a minimum voltage value required to operate the second wireless transceiver.

23. The method according to claim 19, wherein the second voltage value comprises a voltage value to stop an operation of the second wireless transceiver or make the second wireless transceiver wait.

24. The method according to claim 15, wherein the controlling comprises:
activating a control icon for operating the second wireless transceiver to display the activated control icon on the display when identifying that the noise exists in the data included in the received first wireless signal, and
deactivating the control icon to display the deactivated control icon on the display when identifying that the noise does not exist in the data included in the received first wireless signal.

25. A display system comprising:
an electronic apparatus configured to receive at least one of a broadcast signal and broadcasting information, the electronic apparatus including:
a first wireless receiver configured to receive a first wireless signal corresponding to a user's input in a first communication method from an external apparatus,
a second wireless transceiver configured to transmit and receive a second wireless signal in a second communication method different from the first communication method via a network, the second wireless transceiver being supplied a first voltage value, and
a controller configured to compare data included in the first wireless signal received by the first wireless receiver with standard data of the first communication method to identify whether a noise exists in the data included in the first wireless signal, and in response to identifying that the noise exists in the data included in the first wireless signal, control a power supply to change a power supplied to the second wireless transceiver to a second voltage value less than the first voltage value, and
a display apparatus configured to display the at least one of the broadcast signal and the broadcasting information received by the electronic apparatus.

26. A signal transmitting and receiving system comprising:
a first electronic apparatus configured to receive a content by using a first wireless signal and a second wireless signal different from the first wireless signal, the first electronic apparatus including:
a first wireless receiver configured to receive the first wireless signal in a first communication method from an external apparatus,
a second wireless transceiver configured to transmit and receive the second wireless signal in a second communication method different from the first communication method via a network, the second wireless transceiver being supplied a first voltage value, and
a controller configured to compare data included in the first wireless signal received by the first wireless receiver with standard data of the first communication method to identify whether a noise exists in the data included in the first wireless signal, and in response to identifying that the noise exists in the data included in the first wireless signal, control a power supply to change a power supplied to the second wireless transceiver to a second voltage value less than the first voltage value; and
a second electronic apparatus configured to transmit or receive the content from or to the first electronic apparatus by using at least one of the first wireless signal and the second wireless signal.

* * * * *